(12) United States Patent
Smith

(10) Patent No.: US 8,925,241 B1
(45) Date of Patent: Jan. 6, 2015

(54) WEEDLESS FISH LURE

(71) Applicant: Troy C Smith, Prattville, AL (US)

(72) Inventor: Troy C Smith, Prattville, AL (US)

( * ) Notice: Subject to any disclaimer, the term of this patent is extended or adjusted under 35 U.S.C. 154(b) by 0 days.

(21) Appl. No.: 14/182,461

(22) Filed: Feb. 18, 2014

Related U.S. Application Data

(62) Division of application No. 13/068,092, filed on May 3, 2011, now Pat. No. 8,689,479.

(51) Int. Cl.
*A01K 85/02* (2006.01)
*A01K 85/00* (2006.01)

(52) U.S. Cl.
CPC ........................... *A01K 85/02* (2013.01)
USPC .................................... 43/37; 43/42.41

(58) Field of Classification Search
CPC ............................... A01K 85/00; A01K 85/02
USPC ................... 43/34–37, 42.08, 42.41, 42.44
See application file for complete search history.

(56) References Cited

U.S. PATENT DOCUMENTS

| | | | |
|---|---|---|---|
| 519,684 A | 5/1894 | Goff | |
| 1,571,770 A | 2/1926 | Fenner | |
| 1,890,266 A | 12/1932 | Schadell et al. | |
| 2,871,608 A | 2/1959 | Fisher | |
| 3,418,743 A | 12/1968 | Halvorsen | |
| 4,176,489 A | 12/1979 | Levstik | |
| 4,782,618 A | 11/1988 | Rainey | |
| 4,827,656 A | 5/1989 | Ohnishi | |
| 4,976,060 A | 12/1990 | Nienhuis | |
| 6,266,916 B1 | 7/2001 | Dugan | |
| 6,308,453 B1 | 10/2001 | Mayer | |
| 6,651,375 B2 | 11/2003 | Parrish | |
| 6,931,783 B1 | 8/2005 | Faulkner | |
| 7,254,916 B2 | 8/2007 | Mussot | |
| 1,021,699 A1 | 3/2012 | Nordlund | |
| 2006/0196103 A1 | 9/2006 | Mussot | |
| 2007/0044368 A1 | 3/2007 | Duckett | |
| 2012/0137568 A1 | 6/2012 | Walsh et al. | |

*Primary Examiner* — David Parsley
*Assistant Examiner* — Timothy Schwarz
(74) *Attorney, Agent, or Firm* — George L Williamson

(57) ABSTRACT

A hard body fishing lure having a cavity disposed therein which conceals a fish hook held internal the body by a magnet. An axle is provided near the front of the lure about which the hook rotates from the internal position to an external position when the lure is struck by a fish and back pressure is placed on the fishing line so that the hook is deployed from internal the body to external the body so as to hook a fish in the mouth. A tube for receiving the line is placed between two halves of the lure wherein weights are placed near the bottom edges of the halves in order to properly weight the lure body. An additional embodiment is shown wherein a bill or lip is placed on the front of the halves of the lure body in order to make the lure dive deeper into the water column.

7 Claims, 3 Drawing Sheets

WEEDLESS FISH LURE

BACKGROUND OF THE INVENTION

1. Field of the Invention

The present invention relates generally to fishing tackle, and, more particularly, is concerned with a weedless fishing lure.

2. Description of the Related Art

Weedless fishing lures have been described in the related art, however, none of the related art devices disclose the unique features of the present invention. In U.S. Pat. No. 6,651,375 dated Nov. 25, 2003, Parrish disclosed a hard body, weedless fishing lure. In U.S. Pat. No. 4,827,656 dated May 9, 1989, Ohnishi disclosed a lure plug. In U.S. Patent Application Publication No, 2006/0196103 dated Sep. 7, 2006, Mussot disclosed a fishing lure. In U.S. Pat. No. 6,308,453 dated Oct. 30, 2001 Meyer disclosed a safety lure. In U.S. Pat. No. 6,931,783 dated Oct. 23, 2005, Faulkner disclosed a fishing lure with concealed hook. In U.S. Patent Application Publication No. 2007/044368 dated Mar. 1, 2007, Dunkett disclosed a snag resistant and attractive fishing fly. In U.S. Pat. No. 7,254,916 dated Aug. 14, 2007, Mussot disclosed a lure. In U.S. Pat. No. 4,976,060 dated Dec. 11, 1990, Nienhuis disclosed a weedless fishing lure. In U.S. Pat. No. 4,782,618 dated Nov. 8, 1988, Rainey disclosed a weedless fishing lure. In U.S. Pat. No. 4,176,489 dated Dec. 4, 1979, Levstik disclosed a fishing lure with retractable and automatically extendable hook. In U.S. Pat. No. 1,890,266 dated Dec. 6, 1932, Schadell, et at, disclosed a fish lure. In U.S. Pat. No. 1,571,770 dated Feb. 2, 1926, Fenner disclosed an artificial bait. In U.S. Pat. No. 1,021,699 dated Mar. 26, 1912, Nordlund disclosed a fish ban. In U.S. Pat. No. 519,684 dated May 8, 1894, Goff, et al., disclosed a fish hook. In U.S. Pat. No. 6,266,916 dated Jul. 31, 2001, Dugan disclosed a soft plastic lure with hidden hook. While these weedless fish lures may be suitable for the purposes for which they were designed, they would not be as suitable for the purposes of the present invention as hereinafter described.

SUMMARY OF THE PRESENT INVENTION

The present invention discloses a hard body fishing lure having a cavity disposed therein which conceals a fish hook held internal the body by a magnet. An axle is provided near the front of the lure about which the hook rotates from the internal position to an external position when the lure is struck by a fish and back pressure is placed on the fishing line so that the hook is deployed from internal the body to external the body so as to hook a fish in the mouth. A tube for receiving the line is placed between two halves of the lure wherein weights are placed near the bottom edges of the halves in order to properly weight the lure body. An additional embodiment is shown wherein a bill or lip is placed on the front of the halves of the lure body in order to make the lure dive deeper into the water column.

An object of the present invention is to provide, a hard body fishing, lure made of two halves wherein a cavity is provided internal the body in order to conceal a hook contained in the cavity in a position so that the lure becomes weedless and can travel through structure without the hook becoming snagged on the structure. A further object of the present invention is to provide a lure wherein a magnet is used to retain the hook internal the cavity of the body. A further object of the present invention is to provide a hook having an eye attached on one end of the hook adjacent an axle loop so that the hook can be deployed into an exposed position by having back pressure placed on the fishing line. A further object of the present invention is to provide a diving bill on the front of the lure for causing the lure to dive deeper into the water column. An object of the present invention is to provide a lure which can be easily used by an average fisherman. A further object of the present invention is to provide a weedless fishing lure which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
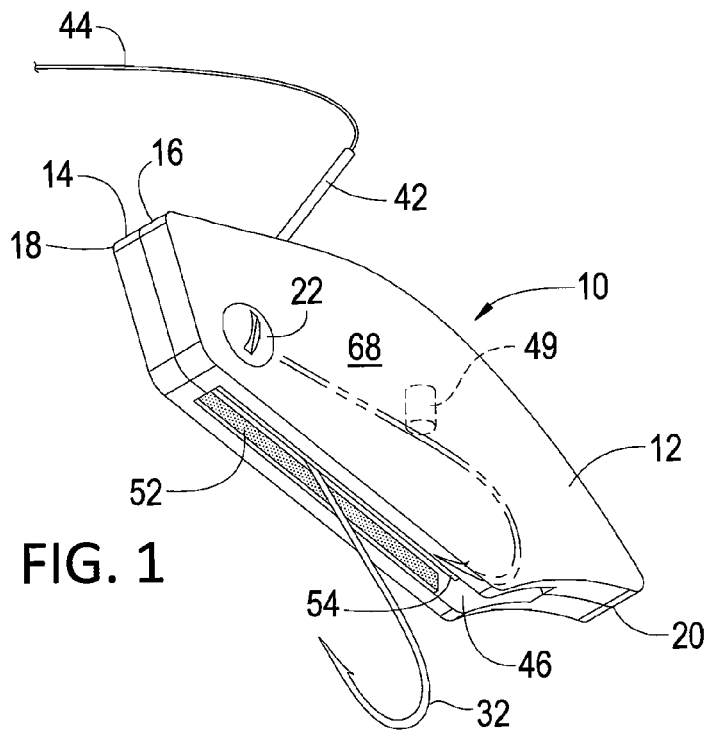
FIG. 1 is a perspective view of the present invention.
Figure 2:
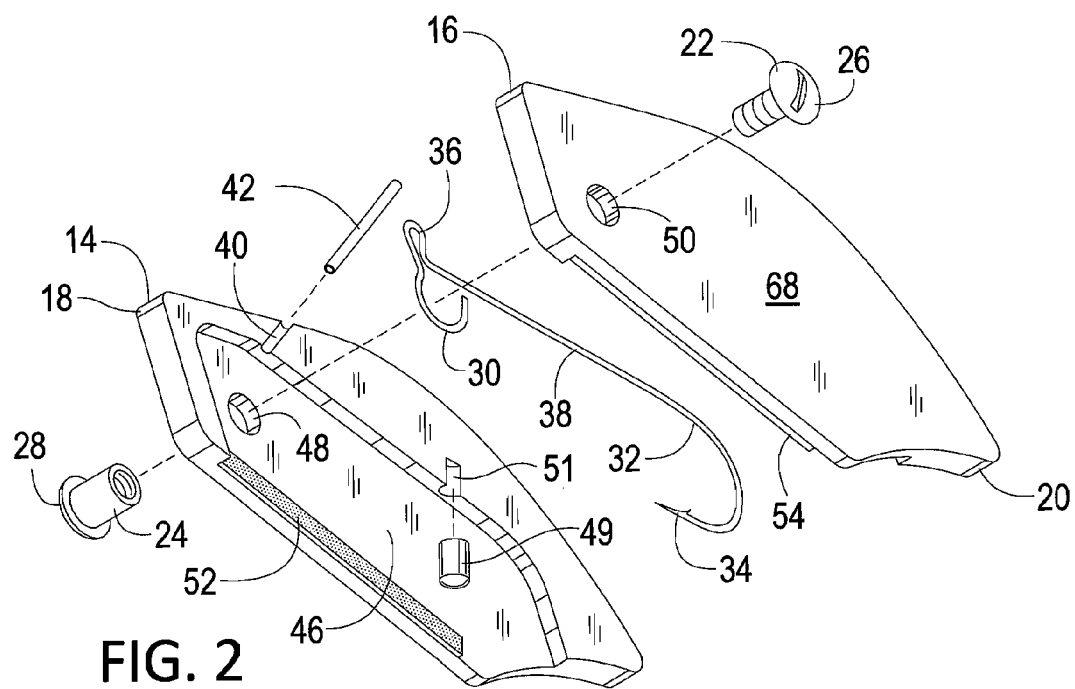
FIG. 2 is an exploded view of the present invention.
Figure 3:
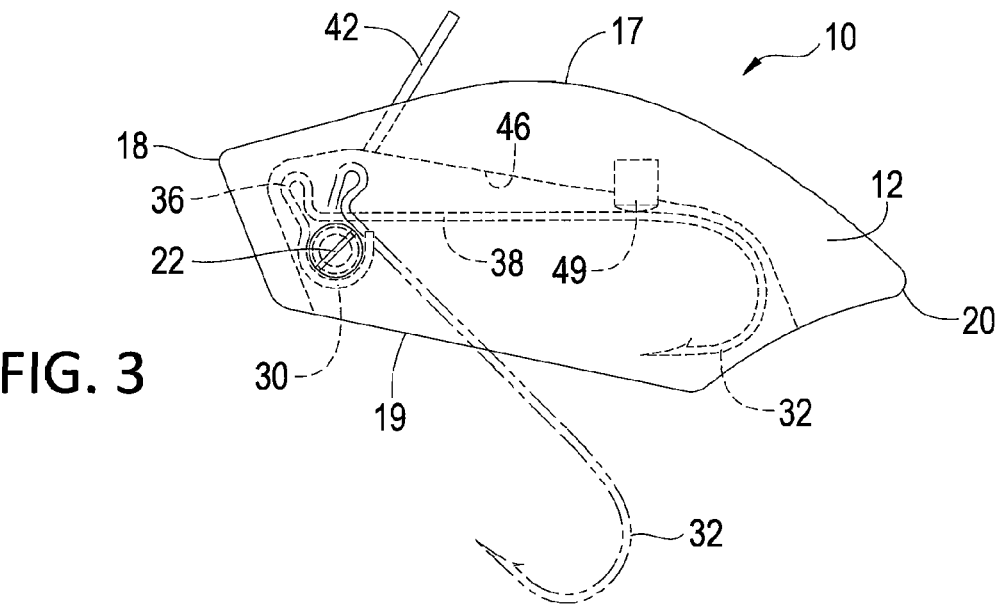
FIG. 3 is a side elevation view of the present invention.
Figure 4:
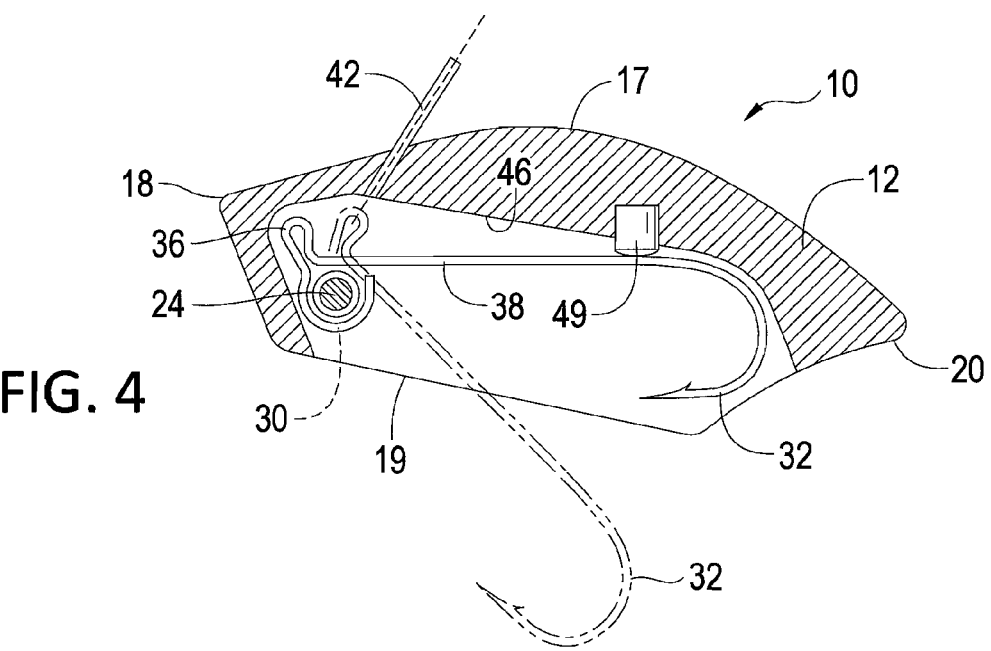
FIG. 4 is a cross sectional view of the present invention.
Figure 5:
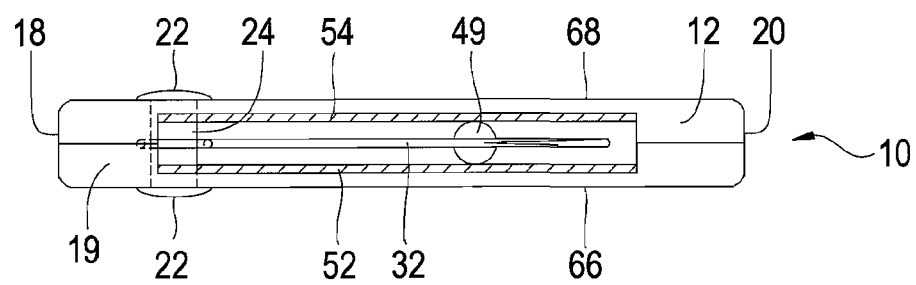
FIG. 5 a bottom view of the present invention.

With regard to reference numerals used, the following numbering is used throughout the drawings.

10 present invention
12 body
14 first half
16 second half
17 upper portion
18 front portion
19 lower portion
20 rear portion
22 fastener
24 axle portion
26 male portion
28 female portion
30 axle loop
32 hook
34 barb
36 eyelet
36 shank
40 first cutout
42 tube
44 line
46 cavity
48 first aperture
49 magnet
50 second aperture
51 second cutout 52 first weight
54 second weight
56 first half of lip
58 second half of lip
60 aperture
62 eyelet
64 hook

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 7 illustrate the present invention wherein a weedless lure is disclosed.

Turning to FIGS. 1 through 5, therein is shown the present invention 10 being a hard body fishing lure having a body 12 which may have a first half 14 and a second half 16 having a generally front portion 18 and a rear portion 20 wherein the two halves are connected by a fastener 22 which also forms an axle or shaft 24 having a male portion 26 in second half 16 and a female portion 28 in first half 14 wherein the axle 24 receives an axle loop 30 of hook 32 wherein the hook has a barb portion 34 and an eye 36 with a shank 38 thereinbetween. Fastener 22 is shown, for example, to be screw post or Chicago screw which allows for smooth water flow around each end of the fastener. Body 12 also has an upper portion 17 and a lower portion 19. Also shown is a first cutout 40 which receives a tube 42 which is captured between the first and second halves 14, 16 through which the line 44 is threaded and the end of the line tied to the eye 36 of the hook 32. Tube 42 prevents the line from kinking and reduces fraying due to contact with body 12. Also shown is an internal cavity 46 which receives the hook 32 therein along with a first aperture 48 in the first half 14 and a second aperture 50 in the second half 16 of the lure along with a magnet 49 which is disposed in a second cutout 51 which is held between the first and second halves 14, 16. The magnet 49 is placed an effective distance from the metal hook 32 so as to capture the hook and hold it in the cavity 46 while the lure is being retrieved through structure so that when a fish strikes the lure body 12 back pressure on the line will cause the hook 32 to move from a first position internal the body cavity 46 to a position external the body 12 so that the hook can be caught in the mouth of a fish. Also shown is a first weight 52 on a first half 14 of the body 12 and a second weight 54 on the second half 16 of the body 12 so as to provide an effective weight to the lure body in order to keep it at an effective depth in the water column. Note that the eyelet 36 is angled with respect to the shank 38 of the hook 32 so that back pressure on the line 44 will cause the barb 34 portion of the hook to be deployed from the internal cavity 46 of the lure body 12 to a position external the body so as to hook a fish in the mouth.

Figure 6:
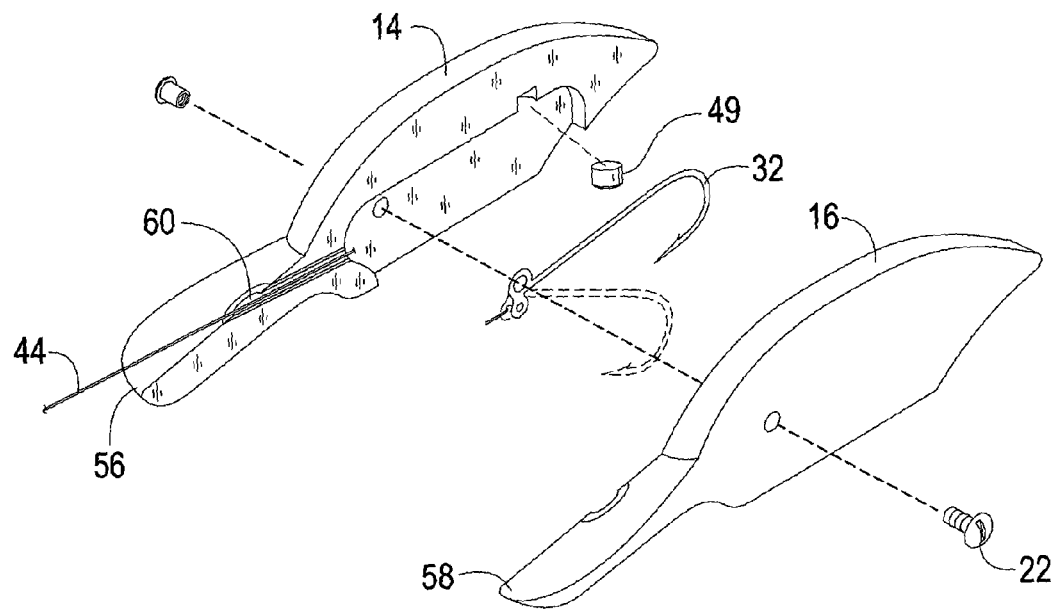
FIG. 6 is an exploded view of an alternative embodiment of the present invention.
Figure 7:
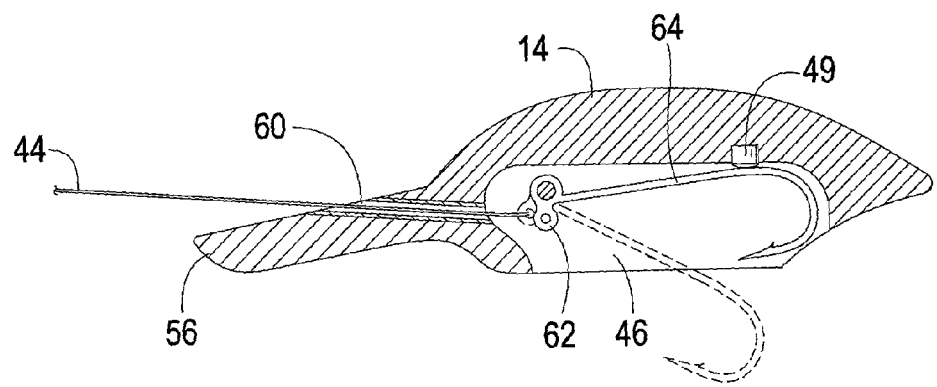
FIG. 7 is a cross sectional view of an alternative embodiment of the present invention.

Turning to FIGS. 6 through 7, therein is shown the present invention it) having a first half bill or lip 56 on the first part 14 of the present invention and a second half of the bill 58 on the second half 16 of the lure body 12. Note that the bill, has an aperture 60 that runs through the bill of the lure from the internal cavity to external of the lure which allows the line 44 to be run to the eyelet 62 of the hook 64. Note that the hook 64 of this embodiment is designed differently from the previous hook shown in FIGS. 1 through 5 so as to cause the hook to be deployed from a cavity 46 inside the lure body 12 to a position external the body when back pressure is placed on the line. Hook 64 is deployed to a position external cavity 46 due to back pressure on the line 44 similarly to the embodiment of FIGS. 1-5.

By way of summary, FIGS. 6 and 7 shows a weedless fishing lure having a body having an upper portion, a lower portion, and a cavity therein; an axle being disposed in the body passing through the cavity; a hook being disposed in the cavity, the hook comprising an axle loop with an eye thereon at one end, a barbed portion at an opposite end of the hook, and a shank joining the axle loop and the barbed portion wherein the axle loop of the hook is rotatable about the axle, wherein the hook is rotatable from a first position internal the cavity to a second position external the body; a wall within the lure extending from a front of the lure to a rear of the lure defining an outer boundary of the cavity, a magnet embedded in the wall of the cavity and extending into the cavity proximate the shank of the hook, the magnet extending along an axis that is transverse to an axis of the axle, wherein the magnet attracts the shank and secures the hook in the cavity; and, a fishing line extending into the cavity through a lip extending; from a forward end of the body to cause the body to dive deeper in the water column wherein the fishing line attaches to the eye of the hook whereby back pressure on the fishing line caused by a fish overcomes attraction of the magnet and rotates the hook from the first position to the second position external the body for hooking the fish.

I claim:

1. A weedless fishing lure, comprising:
   a) a body having an upper portion, a lower portion, and a cavity therein;
   b) an axle being disposed in said body passing through said cavity;
   c) a hook being disposed in said cavity, said hook comprising an axle loop with an eye thereon at one end, a barbed portion at an opposite end of said hook, and a shank joining said axle loop and said barbed portion wherein said axle loop of said hook is rotatable about said axle, wherein said hook is rotatable from a first position internal said cavity to a second position external said body;
   d) a wall within said lure extending from a front of said lure to a rear of said lure defining an outer boundary of said cavity, a magnet embedded in said wall of said cavity and extending into said cavity proximate said shank of said hook, said magnet extending along an axis that is transverse to an axis of said axle, wherein said magnet attracts said shank and secures said hook in said cavity; and,
   e) a fishing line extending into said cavity through a lip extending from a forward end of said body to cause said body to dive deeper in said water column wherein the fishing line attaches to said eye of said hook whereby back pressure on the fishing line caused by a fish overcomes attraction of said magnet and rotates said hook from said first position to said second position external said body for hooking said fish.

2. The weedless fishing lure of claim 1, further comprising a weight mounted in said lower portion of said body to keep said body at an effective depth in a water column.

3. The weedless fishing lure of claim 2, wherein said weight is mounted within and along a bottom edge of said cavity.

4. The weedless fishing lure of claim 1, said body having first and second halves.

5. The weedless fishing lure of claim 4, wherein said first and second halves are mirror images of each other when viewed along a vertical plane, said halves having cutouts which form said cavity when said halves are joined, said weight comprising separate weight portions along a bottom edge of each cutout in said first and second halves of said body.

6. The weedless fishing lure of claim 5, further comprising a fastener extending from a first side of said body through said cavity to a second side of said body, wherein said axle is a portion of said fastener.

7. A weedless fishing lure, comprising:
   a) a body having an upper portion, a lower portion, and a cavity therein;
   b) an axle being disposed in said body passing through said cavity;
   c) a hook being disposed in said cavity, said hook comprising an axle loop with an eye thereon at one end, a barbed portion at an opposite end of said hook, and a shank joining said axle loop and said barbed portion wherein said axle loop of said hook is rotatable about said axle, wherein said hook is rotatable from a first position internal said cavity to a second position external said body;
   d) a magnet mounted in a wall of said body and extending into said cavity proximate said shank of said hook, wherein said magnet attracts said hook and secures said hook in said cavity;
   e) a weight mounted in said lower portion of said body to keep said body at an effective depth in a water column; and
   f) a lip extending from a forward end of said body to cause said body to dive deeper in said water column, a fishing line extending into said cavity through said lip, wherein the fishing line attaches to said eye of said hook whereby back pressure on the fishing line caused by a fish overcomes attraction of said magnet and rotates said hook from said first position to said second position external said body for hooking said fish.

* * * * *